May 1, 1923. 1,453,954
A. J. SCHOLTES
CHASSIS BRACE
Filed Nov. 29, 1921 3 Sheets-Sheet 3
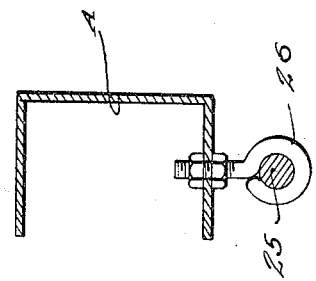
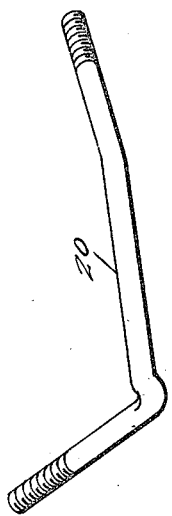
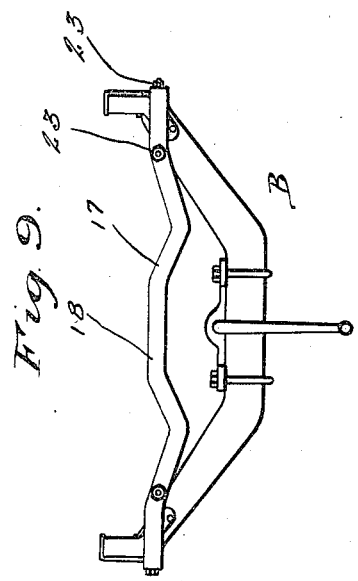
A. J. Scholtes INVENTOR
BY
WITNESSES ATTORNEY Patented May 1, 1923.

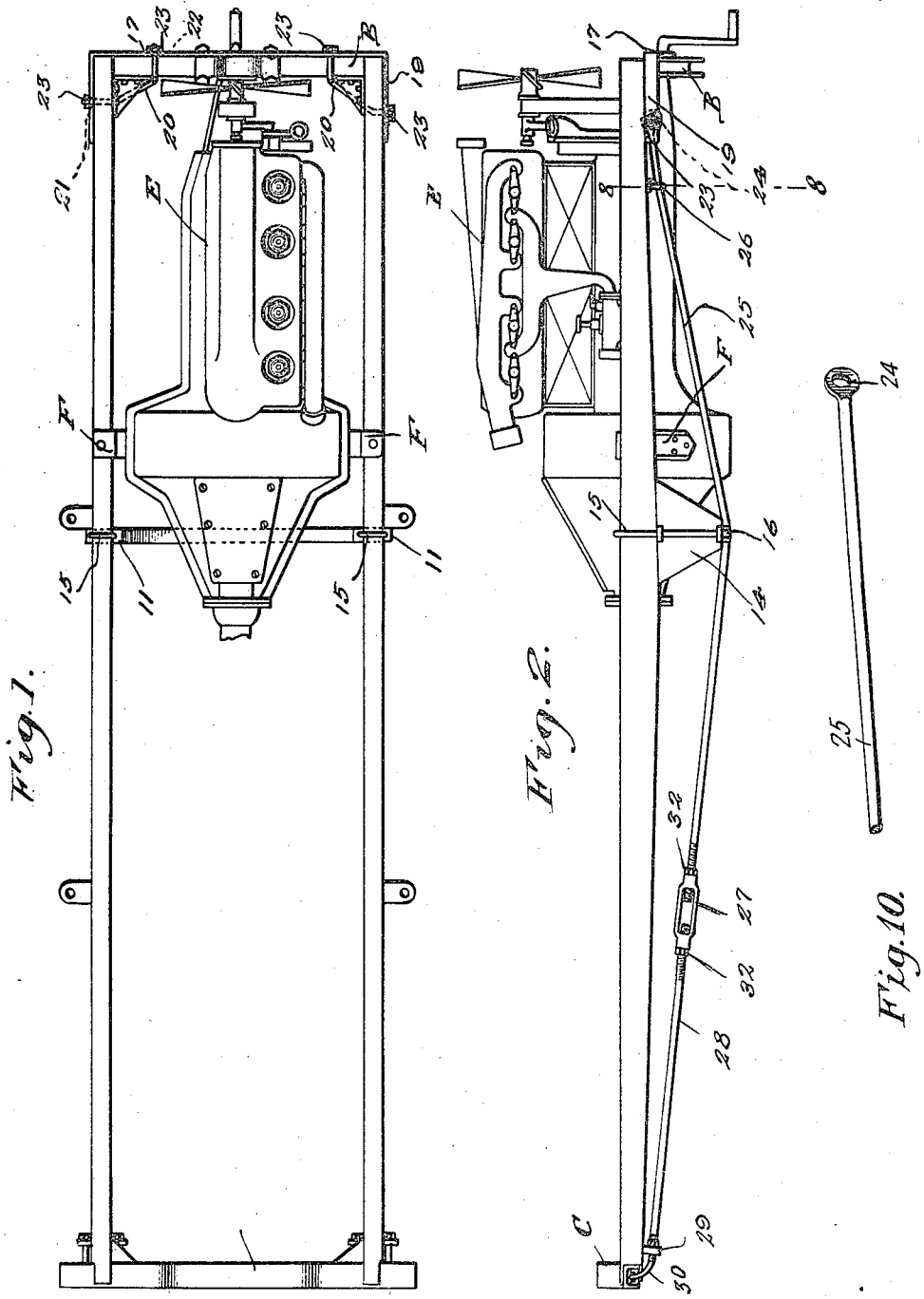

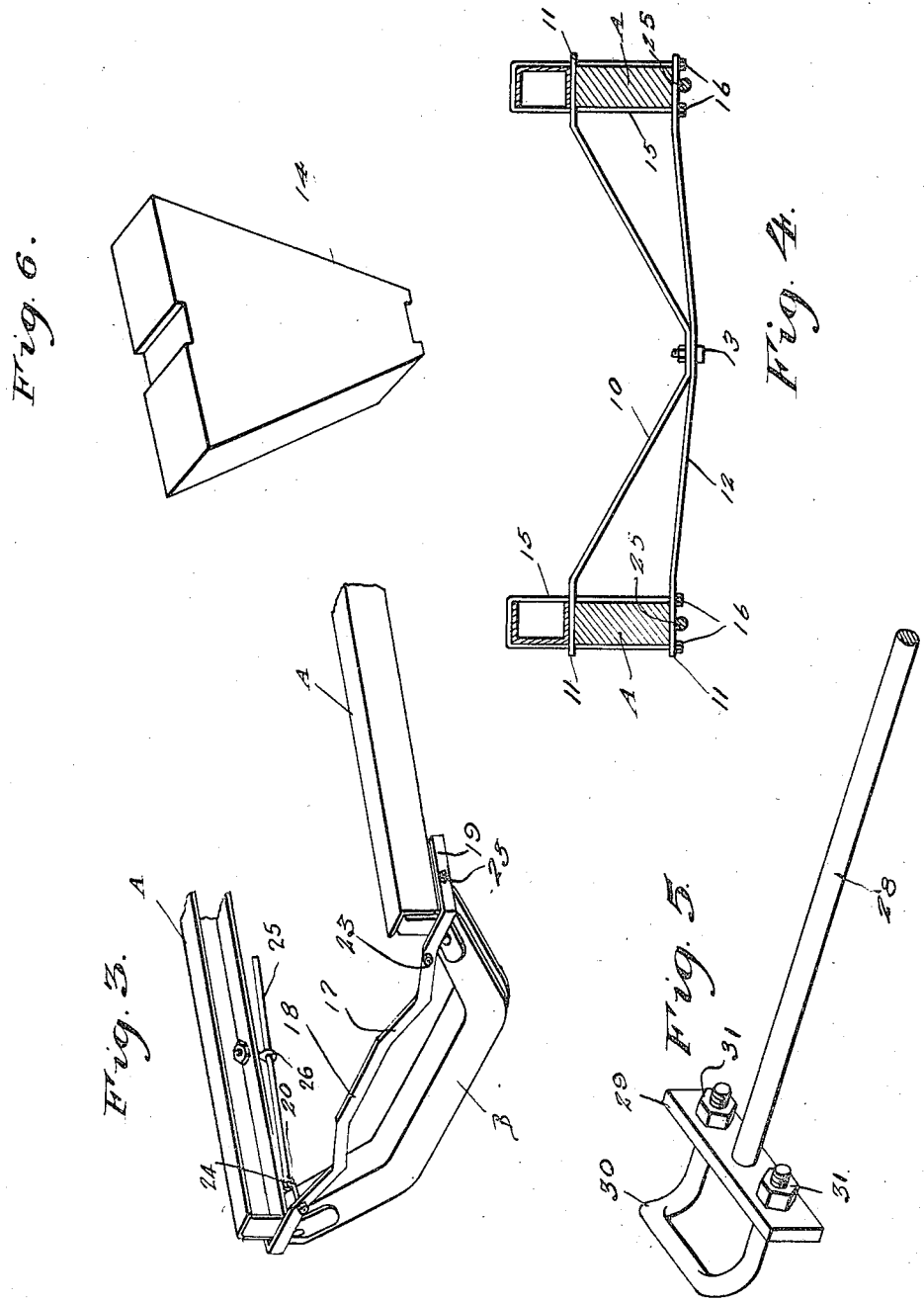

1,453,954

UNITED STATES PATENT OFFICE.

ALBERT J. SCHOLTES, OF MOBILE, ALABAMA.

CHASSIS BRACE.

Application filed November 29, 1921. Serial No. 518,659.

*To all whom it may concern:*

Be it known that I, ALBERT J. SCHOLTES, a citizen of the United States, residing at Mobile, in the county of Mobile and State of Alabama, have invented new and useful Improvements in Chassis Braces, and of which the following is a specification.

This invention relates to the chassis of motor vehicles and has for its object the provision of a novel brace or truss structure whereby to reinforce the frame and prevent downward buckling or outward spreading of the frame bars even under rough usage.

It is well known in the art that the Ford automobile, in particular, among other weaknesses has a very great weakness in the frame which causes the frame bars to spread outwardly at the points where the rear supporting arms of the motor are attached, this outward spreading frequently resulting in breaking off one or both of the motor supporting arms and also causing bulging and warping of the body. It is also well known that the chassis frequently bends downwardly at substantially its center, especially when the vehicle is driven at a comparatively high rate of speed over rough roads. This downward buckling or bending of the frame bars results in warping or racking the body so that the doors thereof will not remain closed or else cannot be shut, also causes the radiator to pull away from its proper position so that the hood will not fit properly, and also causes undue strain upon the universal joint which causes undue wear and friction therein.

It is with the above mentioned disadvantages in view that the present invention has been designed and which has for its object the provision of a truss structure which extends longitudinally and also transversely of the frame whereby to strengthen the same in every particular and prevent any possible bending or warping thereof with the attendant disadvantages accruing to such action.

An important object is the provision of a bracing structure of this character which is so formed that it may be manufactured as a complete and separate entity or article and subsequently applied to already existing automobiles without necessitating any alterations in the construction of the frame.

An additional object is the provision of a bracing device of this character which will be simple and inexpensive in manufacture and installation, highly efficient in use, positive in action, durable in service and a general improvement in the art.

With the above and other objects and advantages in view, the invention consists in the details of construction to be hereinafter more fully described and claimed, and illustrated in the accompanying drawings in which, Figure 1 is a plan view of an automobile chassis showing my bracing structure associated therewith, Figure 2 is a side elevation, Figure 3 is a perspective view of the front end of the bracing device associated with the front cross bar of the frame, Figure 4 is a cross-sectional view showing the transverse truss structure, Figure 5 is a perspective view showing one of the rear cross-member engaging hooks, Figure 6 is a detail perspective view of one of the filler blocks, Figure 7 is a detail perspective view of one of the corner braces or the member engaging the front cross-bar of the frame, Figure 8 is a detail cross section through the forward end of one frame bar of the chassis showing the connection for the truss rod, the section being taken on the line 8—8 of Figure 2, Figure 9 is a front elevation of the front member engaged upon the forward end of the chassis, Figure 10 is a detail view.

Referring more particularly to the drawings the letter A designates the side bars of the frame of a Ford automobile, B designates the front cross-member which connects the forward extremities of the bars A, and C, designates the rear cross-member which connects the rear extremities of the bars A. The letter E designates the motor which is shown very diagrammatically and F designates the laterally extending arms which support the rear end of the motor and transmission mechanism and which are secured to the frame bars A intermediate the ends thereof as clearly shown. The front end of the motor is supported centrally upon the front cross member B as will be readily understood. These details form no part of the present invention but are shown and described as being necessary to the proper understanding of the parts to be hereinafter described.

In carrying out my invention I provide a transverse bracing or truss structure comprising a substantially V shaped bar 10 which is disposed between the frame bars A and which has its ends formed parallel whereby to extend horizontally against the underside of the channeled frame bars A. I also make use of a transverse bar 12 which is also of somewhat angular form and which is disposed against the underside of the central portion of the bar 10 and secured thereto as by means of a suitable bolt, rivet or the like indicated at 13. I also make use of a pair of substantially trapezoidal shaped filler blocks 14 which are preferably formed of oak or other hard wood and which are disposed against the underside of the frame bars A between the laterally bent ends 11 of the bar 10 and the ends of the bar 12 as clearly shown. In order to secure this transverse trussing structure with respect to the frame, I provide inverted U-shaped bolts 15 which extend over and around the frame bars A and which extend through suitably spaced holes provided in the lateral ends 11 of the bar 10 and similar holes through the ends of the bar 12, the arms of the U-bolts being disposed against the sides of the blocks 14 and having their end portions threaded and provided with clamping nuts 16.

In the further carrying out of my invention, I make use of an angularly shaped bar member 17 which is adapted to more or less embracingly engage the front cross bar B of the frame and this bar member 17 has its intermediate portion upwardly offset as indicated at 18 so as not to interfere with the starting crank and the bearing member which supports the front end of the motor, and has its terminal portions bent at right angles to extend rearwardly as shown at 19. This bar member 17 is so arranged that a portion thereof will be disposed in front of the front cross bar B of the frame while the laterally bent ends 19 will extend rearwardly just under and along the sides of the frame bars A adjacent their juncture with the front cross-bar member B. In order to secure this bar 17 in position. I make use of a pair of serpentine shaped but substantially right angular bolt members 20 which have threaded ends disposed through holes 22 formed in the bar 17 and holes 21 in the ends 19, the threaded ends carrying clamping nuts 23 whereby to secure the bars 17 rigidly in position. Engaged upon the bolts 20 are eyes or loops 24 formed upon the forward ends of rearwardly extending angular truss rods 25 which extend through eye bolts 26 secured through the frame bars A near the forward ends thereof. These rods 25 extend below and engage against the end portions of the end bar 12 between the nuts 16 upon the arms of the U-bolts 15. The rear extremities of the rods 25 are threaded as shown and are screwed into turn buckles 27 into the other ends of which are screwed rods 28 which extend to the rear end of the chassis and which have their rear extremities carrying plates 29 through which extend the arms of U-bolts 30 which engage the rear ends of the bars A within the rear cross member C of the frame. These U-bolts 30 of course carry nuts 31. It might be stated that I prefer to employ lock nuts 32 upon the threaded ends of the rods 25 and 28 for the purpose of preventing them becoming loosened with respect to the turn buckles in the event that the machine jars to a great extent.

The transverse trussing structure is of course applied to the frame bars as clearly shown and as above described and the longitudinal truss structure is also applied and the turn buckles 27 are turned up so as to apply the proper degree of tension to the longitudinal rods. When the device is thus installed and properly tightened up it will be quite readily apparent that any downward buckling or lateral spreading of the frame bars A will be postively prevented so that the frame will be practically rigid and will be able to survive all sorts of shocks and jars incident to travel even over the roughest roads at a comparatively high speed.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention, I claim;

1. In combination with the frame of a motor vehicle, a transverse truss structure comprising a substantially V-shaped bar having its ends secured against the underside of the longitudinal frame bars, a second bar secured to the vertex of said first namd bar at the underside thereof. blocks disposed between the ends of said first and second named bars, U-bolts embracing the side bars of the frame and passing through said first and second named bars, said U-bolts carrying clamping nuts, and longitudinally extending adjustable truss rods connected with the front and rear cross members of the frame and engaged against said second named bars between said nuts.

2. Means for bracing the frame of a motor vehicle, comprising a transverse truss structure comprising a substantially V-shaped bar having its ends adapted to by secured against the underside of the longitudinal frame bars, a second bar secured to the apex or vertex of said first named bar, bracing blocks disposed between the ends of said first and second bars, U-bolts for encircling the frame and extending through suitable holes in the ends of said first and second named bars and carrying clamping nuts, longitudinally extending adjustable truss rods adapted for connection with the front and rear cross members of the frame and engaged beneath said blocks, and turn buckles interposed in said last named truss rod.

3. As an article of manufacture, a device for bracing the frame of a motor vehicle, comprising a transverse truss structure comprising a substantially V-shaped bar having its ends adapted to be secured against the underside of the longitudinal frame bars, a second bar secured to the vertex of said first named bar, bracing blocks disposed between the ends of said first and second bars, U-bolts for embracing the frame bars and extending through suitable holes in the ends of said first and second named bars and carrying clamping nuts, longitudinally extending adjustable truss rods adapted for connection with the front and rear cross members of the frame and engaged beneath said blocks, U-bolts formed on the rear ends of said longitudinal truss rods and adapted to be detachably engaged upon the rear cross member of the frame, and a bar device of angular formation adapted to be secured upon the front end of the frame and connected with said last named frame truss bars.

4. As an article of manufacture, a device for bracing the frame of a motor vehicle, comprising a transverse truss adapted to be secured to the side bars of a vehicle frame intermediate the ends thereof, blocks held by said truss at the ends thereof and constituting struts, an angularly shaped bar adapted to be engaged against the front cross member of the frame and having laterally extending ends engaging against the outer sides of the longitudinal frame bars and projecting therebelow, angular bolts extending through said lateral ends and through the bar in spaced relation to the ends for clamping the bar upon the frame, longitudinally adjustable truss rods formed at their forward ends with eyes engaged upon said bolts, said last named truss rods being angular and engaging beneath said struts and hook members carried by the other ends of said last named truss rods and adapted for connection with the rear cross member of the frame.

In testimony whereof I affix my signature.

ALBERT J. SCHOLTES.